(12) United States Patent
Cun

(10) Patent No.: US 12,434,592 B2
(45) Date of Patent: Oct. 7, 2025

(54) DIRECTED ELECTRIC VEHICLE CHARGING SYSTEM FOR GENERATING REVENUE AND METHODS THEREOF

(71) Applicant: Honda Motor Co., Ltd., Tokyo (JP)

(72) Inventor: David Wong Cun, Fountain Valley, CA (US)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 18/424,393

(22) Filed: Jan. 26, 2024

(65) Prior Publication Data

US 2025/0242709 A1 Jul. 31, 2025

(51) Int. Cl.
| | |
|---|---|
| *B60L 53/68* | (2019.01) |
| *B60L 53/65* | (2019.01) |
| *B60L 53/66* | (2019.01) |
| *B60L 58/12* | (2019.01) |
| *G06Q 30/0283* | (2023.01) |
| *G06Q 30/04* | (2012.01) |
| *G06Q 50/06* | (2012.01) |

(52) U.S. Cl.
CPC ............. *B60L 53/665* (2019.02); *B60L 53/65* (2019.02); *B60L 53/68* (2019.02); *B60L 58/12* (2019.02); *G06Q 30/0284* (2013.01); *G06Q 30/04* (2013.01); *G06Q 50/06* (2013.01); *B60L 2240/72* (2013.01)

(58) Field of Classification Search
CPC ........ B60L 53/665; B60L 53/65; B60L 53/68; B60L 58/12; B60L 2240/72; G06Q 30/0284; G06Q 30/04; G06Q 50/06
See application file for complete search history.

(56) References Cited

U.S. PATENT DOCUMENTS

| | | | |
|---|---|---|---|
| 9,610,853 B1 | 4/2017 | Miller et al. | |
| 9,851,213 B2 | 12/2017 | Oh et al. | |
| 9,909,913 B2 | 3/2018 | Tomita et al. | |
| 10,857,902 B2 | 12/2020 | Goei et al. | |

(Continued)

FOREIGN PATENT DOCUMENTS

| | | |
|---|---|---|
| CN | 113532469 A | 10/2021 |
| CN | 114440918 B | 8/2022 |

(Continued)

*Primary Examiner* — Garcia Ade
(74) *Attorney, Agent, or Firm* — Aaron Fong; American Honda Motor Co., Inc.

(57) ABSTRACT

The present disclosure relates to a directed electric vehicle charging system for generating revenue and methods thereof. More particularly, this disclosure describes a telematics service provider that maintains relationships with charging stations and their associated stores such that revenue may be realized by directing vehicles to those charging stations. In an illustrative embodiment, the telematics service provider may receive a charge event from a vehicle and in turn, the provider provides an appropriate charging station to that vehicle. An amount spent at the charging station including its associated stores are tracked when the vehicle charges at the charging station. After completing the charging and the vehicle leaves the area, the amount spent is tallied and provided to the telematics service provider. A portion of the amount spent may then be sent to the telematics service provider for the recommended charging station.

20 Claims, 8 Drawing Sheets

(56) References Cited

U.S. PATENT DOCUMENTS

| | | | |
|---|---|---|---|
| 10,953,767 B2 | 3/2021 | Loghavi et al. | |
| 2016/0339793 A1* | 11/2016 | Khoo | B60L 53/66 |
| 2018/0111494 A1* | 4/2018 | Penilla | G06Q 20/145 |
| 2021/0046843 A1* | 2/2021 | Maeda | G01C 21/3469 |
| 2021/0080282 A1* | 3/2021 | Goei | B60L 53/665 |
| 2022/0048400 A1 | 2/2022 | Sumi et al. | |
| 2022/0228877 A1 | 7/2022 | Feldman et al. | |
| 2024/0157837 A1* | 5/2024 | Lee | B60L 53/65 |

FOREIGN PATENT DOCUMENTS

| | | | | |
|---|---|---|---|---|
| EP | 2199143 A1 * | 6/2010 | | B60L 53/65 |
| JP | 5439242 B2 | 3/2014 | | |
| KR | 101321019 B1 | 10/2013 | | |

\* cited by examiner

| Item 1 | Bananas | $1.50 |
| Item 2 | Doughnuts | $3.65 |
| Item 3 | Soda | $1.99 |

704

702

DIRECTED ELECTRIC VEHICLE CHARGING SYSTEM FOR GENERATING REVENUE AND METHODS THEREOF

BACKGROUND

Electric vehicles contain electric storage mechanisms (e.g., electric engines powered by rechargeable batteries) to store electricity. The electric storage mechanisms may be replenished periodically by using, for example, charging equipment installed at public charging stations. Operators of these public charging stations may provide services or sell products while the electric vehicle driver charges. Amenities at a particular location may include, for example, gifts, snacks, food, and maintenance services.

With increased competition of newly opened public charging stations, operators oftentimes find it difficult to draw in customers that not only use their charging stations but purchase amenities as well. Revenue generated from these customers are hard to track and associated with telematics services that drove the customers into the operator's store.

The present disclosure provides for a directed electric vehicle charging system for generating revenue and method thereof that addresses the above identified concerns. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a vehicle is provided. The vehicle may include at least one processor and a memory operatively coupled to the processor, the memory storing program instructions that when executed by the processor, causes the processor to perform processes. The processes may include receiving information about a charging station from a telematics service. A spent amount at the charging station is computed when the vehicle charges at the charging station with a portion of the spent amount provided to the telematics service that provided the information about the charging station.

In accordance with another aspect of the present disclosure, a method for directing vehicles to a charging station to generate revenue is provided. The method may include receiving a charge event from a vehicle, determining information about a charging station for the charge event, receiving an amount spent at the charging station if the vehicle arrives at the charging station, and billing the charging station a portion of the amount spent.

In accordance with yet another aspect of present disclosure, a server is provided. The server may include at least one network connection and a control system for communicating with a plurality of vehicles over the at least one network connection to provide charging stations. The control system may receive information about a charge event from a vehicle and determine information about a charging station for the charge event, wherein the control system receives a total amount spent at the charging station when the vehicle charges at the charging station and bills the charging station a portion of the total amount spent.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to a directed electric vehicle charging system for generating revenue and methods thereof. More particularly, this disclosure describes a telematics service provider that maintains relationships with charging stations and their associated stores such that revenue may be realized by directing vehicles to those charging stations. In an illustrative embodiment, the telematics service provider may receive a charge event from a vehicle and in turn, the provider provides an appropriate charging station to that vehicle. An amount spent at the charging station including its associated stores are tracked when the vehicle charges at the charging station. After completing the charging and the vehicle leaves the area, the amount spent is tallied and provided to the telematics service provider. A portion of the amount spent may then be sent to the telematics service provider for the recommended charging station.

Numerous other modifications or configurations to the directed electric vehicle charging system for generating revenue and methods thereof will become apparent from the description provided below. For example, while immediate payment to the telematics service provider was shown above, payment may be made after a certain threshold is established from that particular charging station. Advantageously, a finder's fee may be given to a telematics service provider that provided such recommendations. More customers may be directed towards that charging station driving revenue up for both parties. Other advantages will become apparent from the description provided below.

Figure 1:
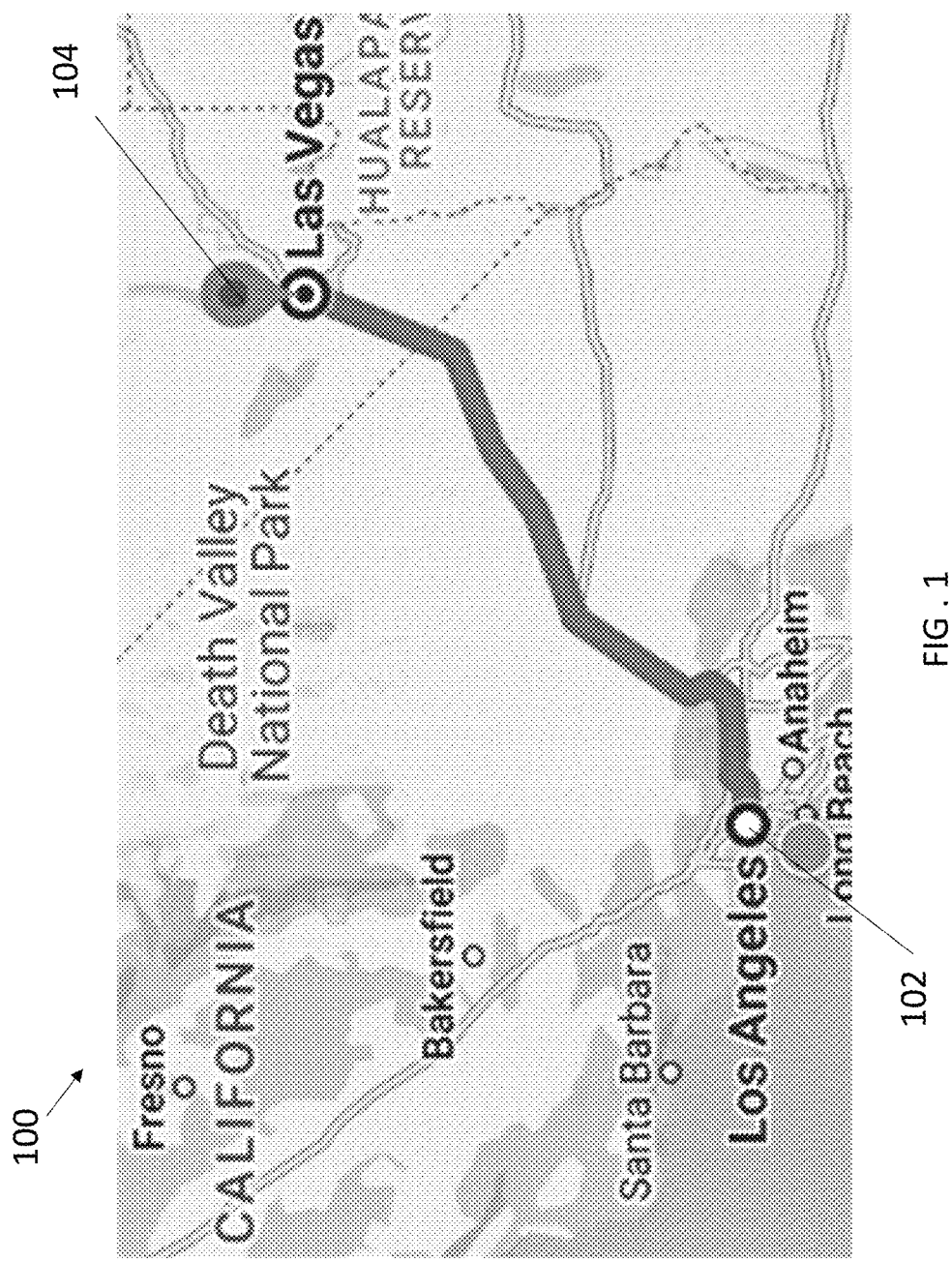
FIG. 1 is a schematic diagram of an illustrative map showing a planned itinerary for a driver of an electric vehicle in accordance with one aspect of the present disclosure.

With reference to FIG. 1, a schematic diagram of an illustrative map 100 showing a planned itinerary for a driver of an electric vehicle in accordance with one aspect of the present disclosure is provided. Typical electric vehicles currently have a range of 250 miles. Charging may be required during the trip. In one example, a driver of an electric vehicle travelling from Los Angeles 102 to Las Vegas 104 may have to stop midway for charging. Charging times may be anywhere from 20 minutes to 1 hour. The charging station at the midway point may have an associate store that sells gifts, snacks, and food. Furthermore, and at the charging stations, maintenance services such as oil changes, dent repairs, windshield wiper replacement, and the like may be performed. All of these may contribute to additional revenue beyond the sale of electricity to charge the vehicle. For purposes of this disclosure, the charging location and its associated stores and amenities may be considered the same or similar.

Figure 2:
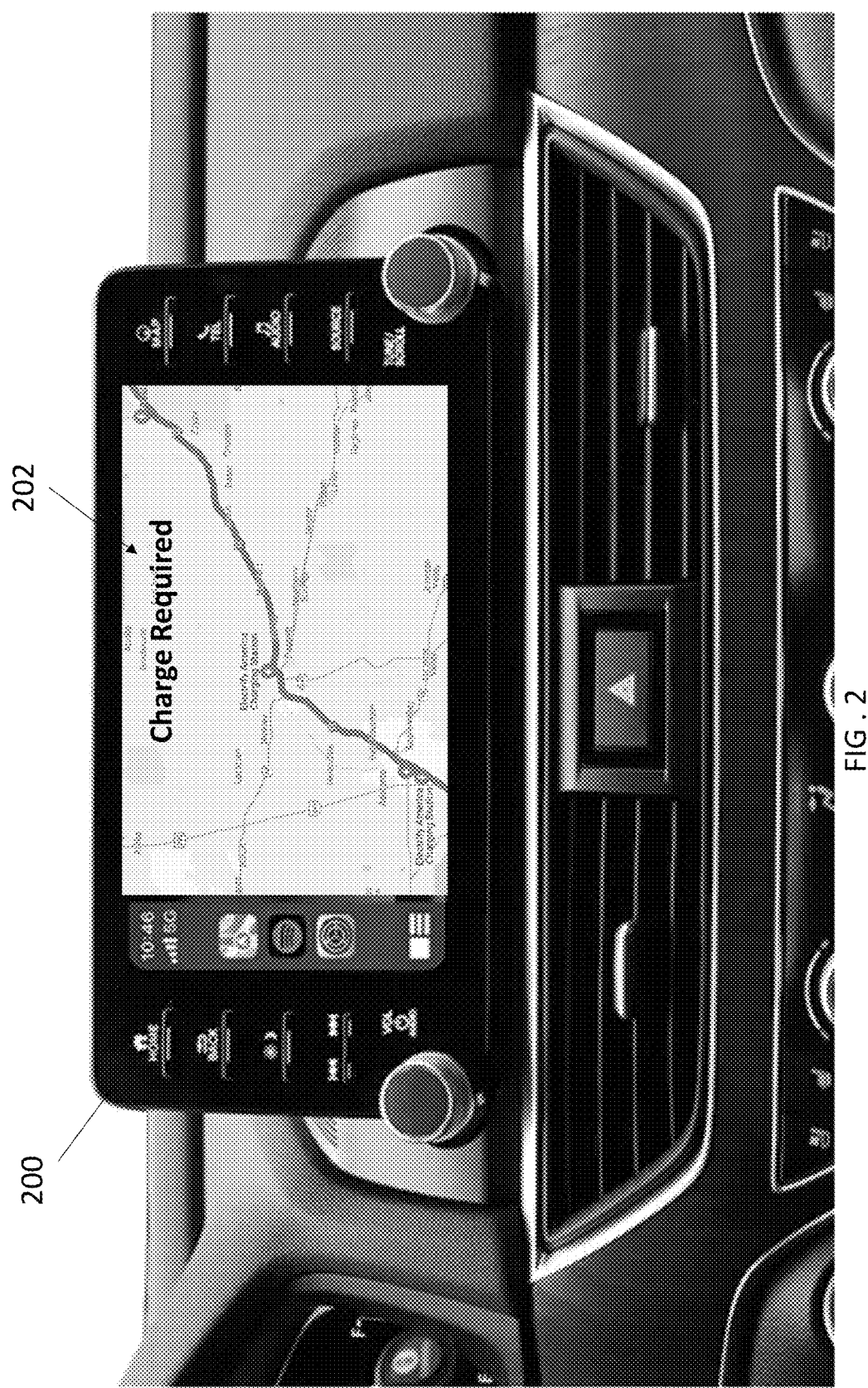
FIG. 2 is a schematic diagram of an illustrative head unit showing the planned itinerary for the driver of the electric vehicle with a charge required indicator in accordance with one aspect of the present disclosure.

FIG. 2 is a schematic diagram of an illustrative head unit 200 showing the planned itinerary for the driver of the electric vehicle with a charge required indicator 202 in accordance with one aspect of the present disclosure. The map may be zoomed in/out through typical telematic hand gestures or dials/buttons. When a charge event occurs, the user or driver may be notified on the head unit 200 such as the indicator 202 stating "Charge Required". Other forms of notification may be provided either through haptics, visual cues, or audial cues to notify that a charge is required.

In the system described herein, the "Charge Required" may automatically initiate a sequence for finding a charging station. This may occur automatically through an on-vehicle system. Charging may be required after a state-of-charge threshold has been met, for example, the vehicle is at or below 20% state-of-charge. The threshold may be adjustable dependent on the distances of a next available charging stations, terrain, or weather.

User preferences may also be used to determine which charging station to direct the electric vehicle to. For example, a user may wish to charge where amenities are provided or where there are highly rated restrooms. Other examples of user preferences may include whether the facilities have specific food items or a particular coffee chain. When the indicator 202 is provided, these parameters may be taken into account for determining a best fit charging station.

In one embodiment, the telematics service provider may account for maximum revenue generation. The charging station that would provide the highest revenue along with the parameters described above may be selected as the charging station to direct the electric vehicle to. A balance may be used that takes into account revenue, user preferences, and other criteria.

Figure 3:
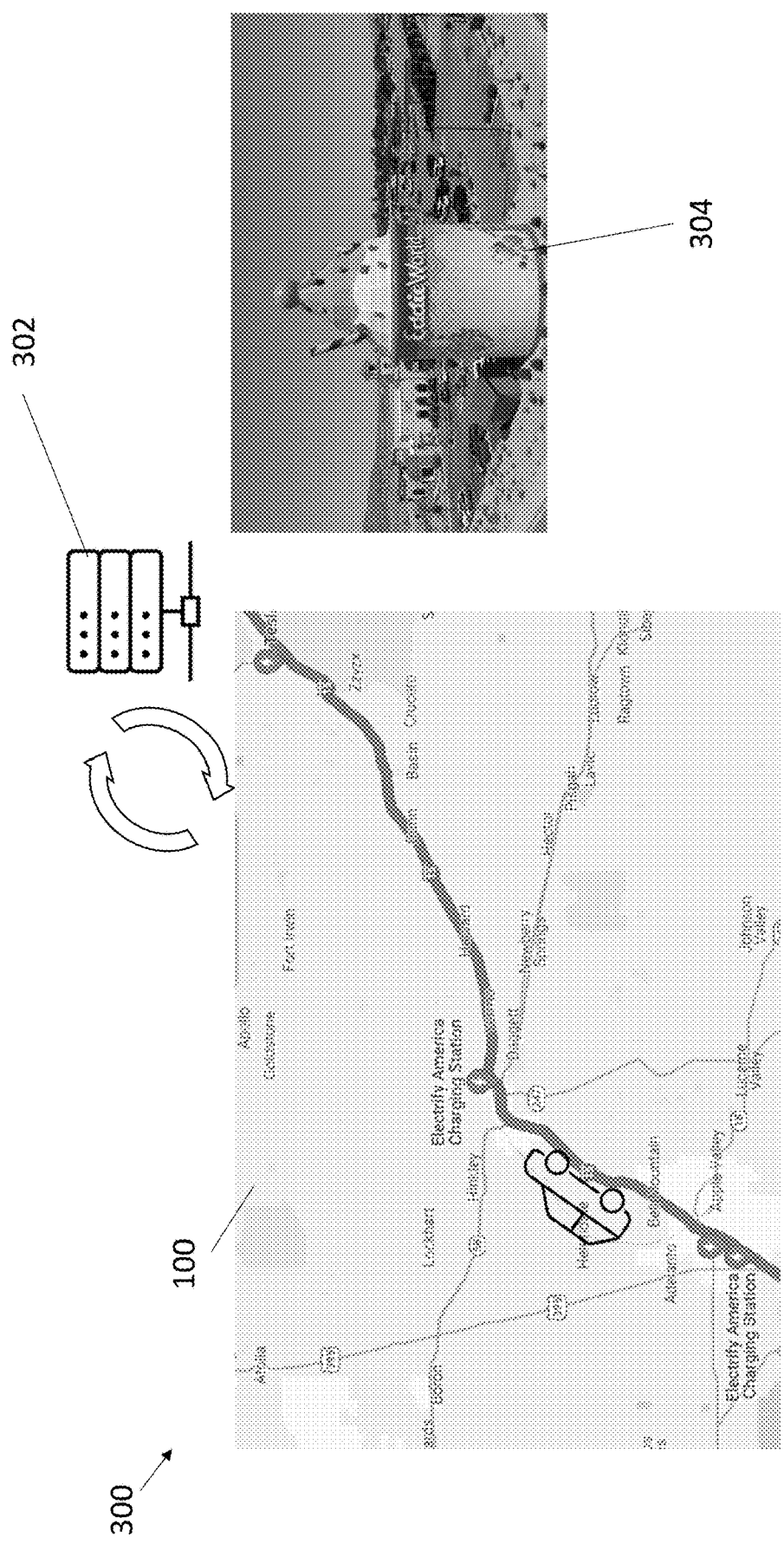
FIG. 3 is a schematic diagram of an illustrative server managing information between the electric vehicle and a directed location in accordance with one aspect of the present disclosure.

FIG. 3 is a schematic diagram of an illustrative server 302 managing information between the electric vehicle and directed location in accordance with one aspect of the present disclosure. As previously described, the map 100 shows that the driver of the vehicle is approaching a charging station and is in need of a charge. The charging event in the background may then initiate an action to a server 302 for requesting information about a charging station with the server 302 being operated by the telematics service provider.

The telematics service provider operating on the server 302 provides the directed to charging station as a pay for feature. The pay for feature would be the charging station paying for such services. In a typical example, the revenue generated from the user shopping at a directed to charging station 304 would go to the telematics service provider. In addition, the revenue may also be provided to the driver as an extra incentive for going to the charging station 304.

The transactions and the amount spent may be maintained by the server 302. The server 302 may include circuitry and/or an interface through which the various control units, components, and/or systems may communicate with each other. In accordance with an embodiment, a communication of audio/video data may occur by use of a Media Oriented Systems Transport (MOST) multimedia network protocol of the control system or other network protocols for the communication. Various devices or components may connect to the control system, in accordance with various wireless or wireline communication protocols. The control system may facilitate access control and/or communication between the electric vehicle, the charging station 304, and the processor with the components.

The server 302 may include at least one network connection and a control system for communicating with a plurality of vehicles over the at least one network connection to provide information about charging stations 304. The control system may receive information about a charge event from a vehicle and determine a charging station for the charge event. The control system may receive a total amount spent at the charging station when the vehicle charges at the charging station and may bill the charging station a portion of the total amount spent.

The server 302 may maintain a database of charging stations 304 and their associated stores and amenities. For example, information about a charging station 304 may be maintained on a database of charging stations 304 stored on the server 302. The information may include store contact information, addresses, managers, and the like. In addition, amenities or maintenance facilities may be stored information on the database associated with the server 302. The server 302 may also be dynamically updated for charging rates, whether DCFC is available, types of connectors required at the charging station, the availability of the charging stations, and the proximity to other attractions or features.

Once information is processed from the vehicle, that is the charge event, a charging station 304 may be determined or located for the driver. In one embodiment, revenue for the telematics service provide is the main consideration. Other parameters may also be used as described above. The server 302 may include information about the revenue for each charging station that they are willing to provide. The charging station 304 may provide different rates for the total amount spent. For example, one charging station 304 may provide 2% of the total amount spent while another may provide 3%. The telematics service provider would then take this into consideration for maximum revenue generation as well as other parameters such as user preferences.

In one embodiment, the portion of the spent amount may be varied by the charging station 304. This portion may vary depending on a time of year, whether the charging station is busy, weather conditions, and the like to draw more customers in. For example, the return revenue may be more when the weather is poor to drive in more customers. These rates may be set by the operators of the charging stations 304 or may be dynamically set on how busy the charging station 304 is. As such, the revenue may be variable.

Continuing with FIG. 3, and putting together the pieces, a charge event is followed by a communication to the server 302 in the background. The server 302 may then direct the driver of the electric vehicle to the charging station 304. The driver of the vehicle may drive to the charging station 304, and depending on if they do, the telematics service provider operating on the server 302 may track purchases at the charging station 304 for which it directed the electric vehicle to. A portion of the total amount spent may then be billed to the operator of the charging station 304.

Figure 4:
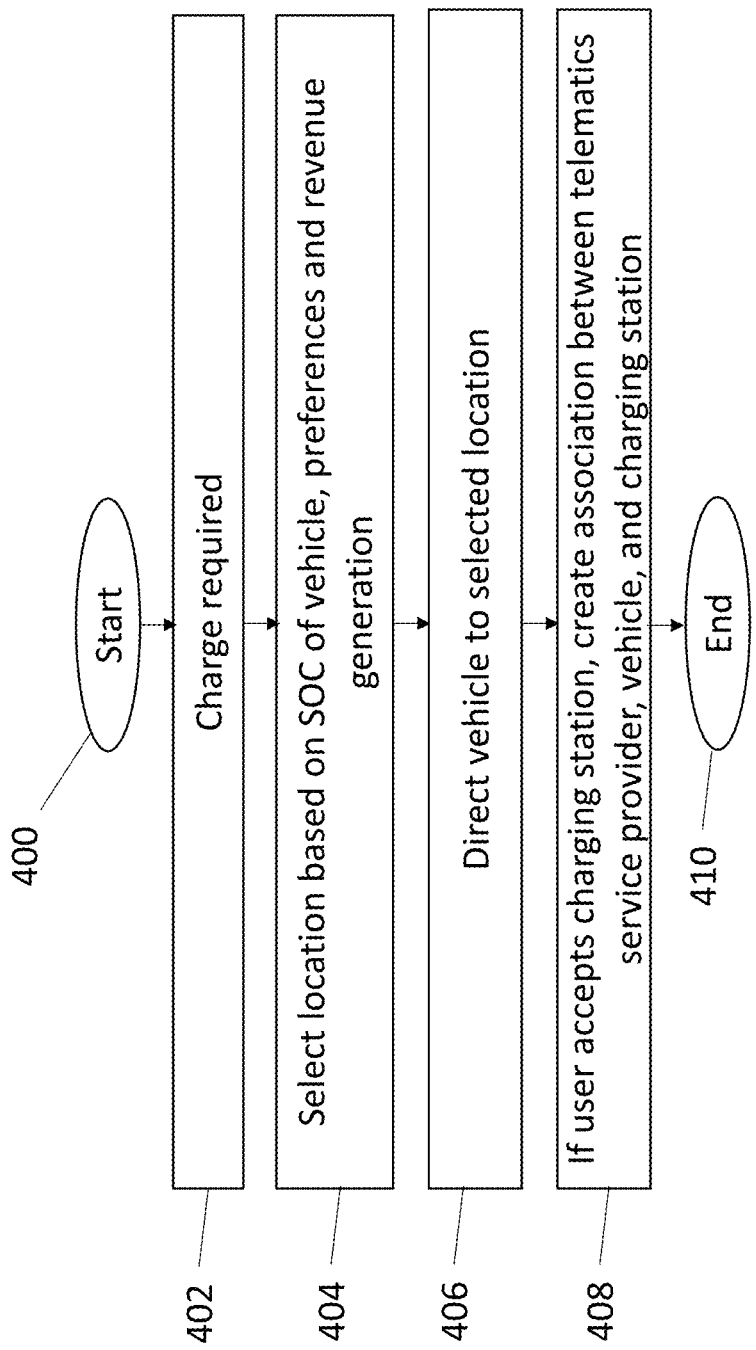
FIG. 4 is a flow chart showing illustrative processes for directing an electric vehicle to a specific location in accordance with one aspect of the present disclosure.

FIG. 4 is a flow chart showing illustrative processes for directing an electric vehicle to a specific location in accordance with one aspect of the present disclosure. By pointing the electric vehicle to a specific charging station that has an established relationship, the telematics service provider may generate revenue. The processes may begin at block 400. Fewer or more processes may be used and are not limited to those shown within the flow chart.

The telematics service provider may have established relationships (or used a third party service) for tracking charging stations that are a part of the system. The telematics service provider may access databases of other third party services to determine whether the charging station takes part of the revenue sharing system through directing electric vehicles. This may be maintained by a database system that may be centralized or decentralized. The database may maintain information such as percentage of revenue that a charging station is willing to provide, the amenities the place provides, the location, hours, manager information, and the like such that this information may be used to make an informed decision about which charging station to direct the electric vehicles to.

At block 402, a charge event may be received by the telematics service provider from the electric vehicle. The charge event may occur when a vehicle drops below a threshold value of charge within its battery. For example, 20% may be defined as the threshold for initiating the charge event. This is not limited to a static amount and may be dynamic in nature. For example, the threshold may vary depending on urban/rural driving, weather conditions, upcoming trips or plans, and the like. The charge event may be generated on the vehicle and may be transmitted to the telematics service provider through a wireless cellular connection or other network connection. In one embodiment, the charge event may be triggered by the driver themselves. That is, no threshold is defined but rather the driver is looking for a charging station for filling up.

At block 404, the telematics service provider may select a location based on the state-of-charge of the vehicle, preferences and revenue generation capabilities. Described beforehand, the telematics service provider may communicate with a third party supplier to gather the information and provide a charging station. This may be based on a best revenue and weighted against a number of factors such as distance, capability of reaching the charging station, user preferences, and the like.

In one embodiment, a number of selections may be provided that show revenue providing charging stations and the user may be able to select their preference from there. Revenue and non-revenue generating stations may be shown. In one embodiment, a portion of the revenue may be given back to the electric vehicle driver who selects the specific station and they may make their decision on the biggest portion of revenue they may obtain.

Other incentives may also be provided such as coupons at different charging stations such that more of a draw to that specific charging station may be provided. The coupons may be variable depending on the revenue that the charging station is willing to give. A balance between the telematics service provider, charging station, and the driver of the electric vehicle may be used to determine the optimal charging station to go to based on revenue generation and incentives.

At block 406, and after the selected location has been determined, the vehicle may be directed to that particular charging station. When directed, formal directions may be provided to the vehicle through the earlier connections, that is, through cellular communications or another network. In addition, to the charging station, directions may be provided by the telematics service provider. This may be sent to the head unit and processed there. In another embodiment, a third party mapping service may be used that takes in the selected location and adds directional services. For example, the selected location may be provided by the telematics service provider and the third party mapping service would take the location and direct the driver to that location through another portal connection. Multiple ways and methods are realized and are not limited to directing the vehicle driver to the selected location.

If the user accepts the charging station recommendation, at block 408, an association is created between the telematics service provider, vehicle, and location. Through this, transactions at the charging station may be kept track of and the total amount spent at the charging station may be determined. A unique identifier may be created for this transaction and be stored by the telematics service provider. A database may store transactions for the users of the system such that accounts may be maintained and payments may be processed. The unique identifier may be stored at the telematics service provider, the cloud, on the vehicle itself, or other location where the integrity of the data and financial transactions are maintained through secure processes.

The processes may end at block 410. Once the target station has been selected and provided to the driver of the electric vehicle, the unique identification was created to maintain the transactions. The unique identifier may be created at this time or other time when the driver has been confirmed to have reached the charging station. For example, even though the charging station was provided, the user may decide to change their mind and not charge after all or at the provided charging station. In this way, the transactions may be kept track of.

Figure 5:
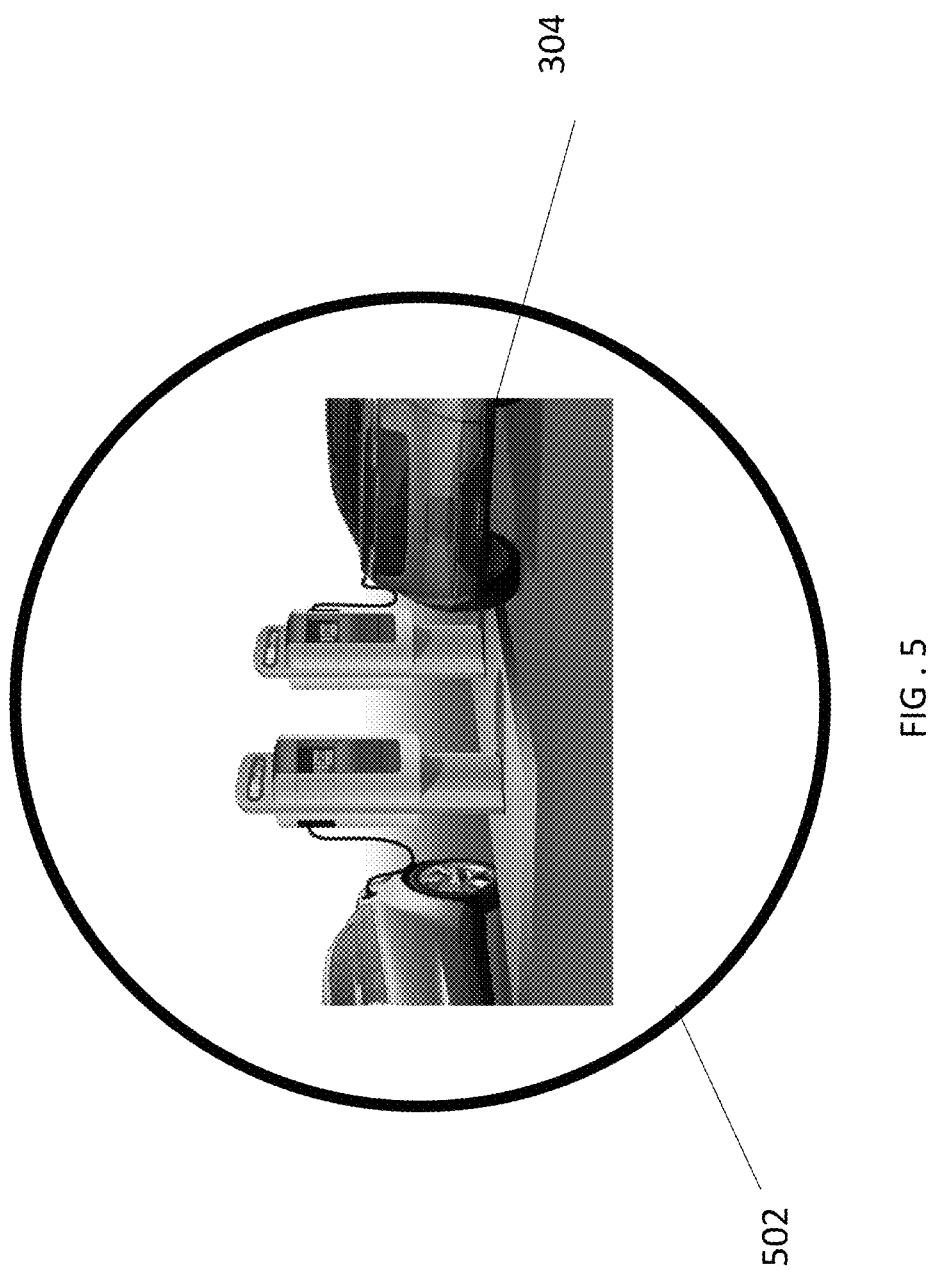
FIG. 5 is a schematic diagram of an illustrative charging station indicating that the electric vehicle driver has indeed started charging at the specific directed location in accordance with one aspect of the present disclosure.

FIG. 5 is a schematic diagram of an illustrative charging station 304 indicating that the electric vehicle driver has indeed started charging at the specific directed location in accordance with one aspect of the present disclosure. Beforehand, a unique identifier was created for the electric vehicle who was given a charging station location to drive to for revenue generation. The unique identification may be created afterwards or other time. To properly provide revenue, a verification or authentication process may be used to determine whether the user indeed has started charging at the directed to charging station 304.

In one embodiment, a geofence 502 may be used to verify that the driver of the electric vehicle is at the charging station 304. When the geofence 502 is entered into, the telematics service provider may receive indicators that the driver intends to charge there and that the unique identifier may be activated such that transactions may be kept track of. By performing this, the data and information may be authenticated such that transactions may be verified and that the intended recipient of the directed charging station 304 may indeed actuate the revenue sharing system as a result of the driver actually charging at the location.

Authentication may occur through other methods beyond geofencing. For example, charging increases may be sensed on the vehicle and the charging station would indicate that the driver is at the directed to charging station. The unique identifier established earlier may track this information. This information may be provided through the user's mobile phone or through the transmission control unit (TCU). The information may be sent through a cellular network or other network connection associated with the charging vehicle, the charging station, or some other connected network attached thereto. A wireless or wireline connection may be used to establish the connection. In one example, wireline or wireless networks may be provided by the charging station 304.

Figure 6:
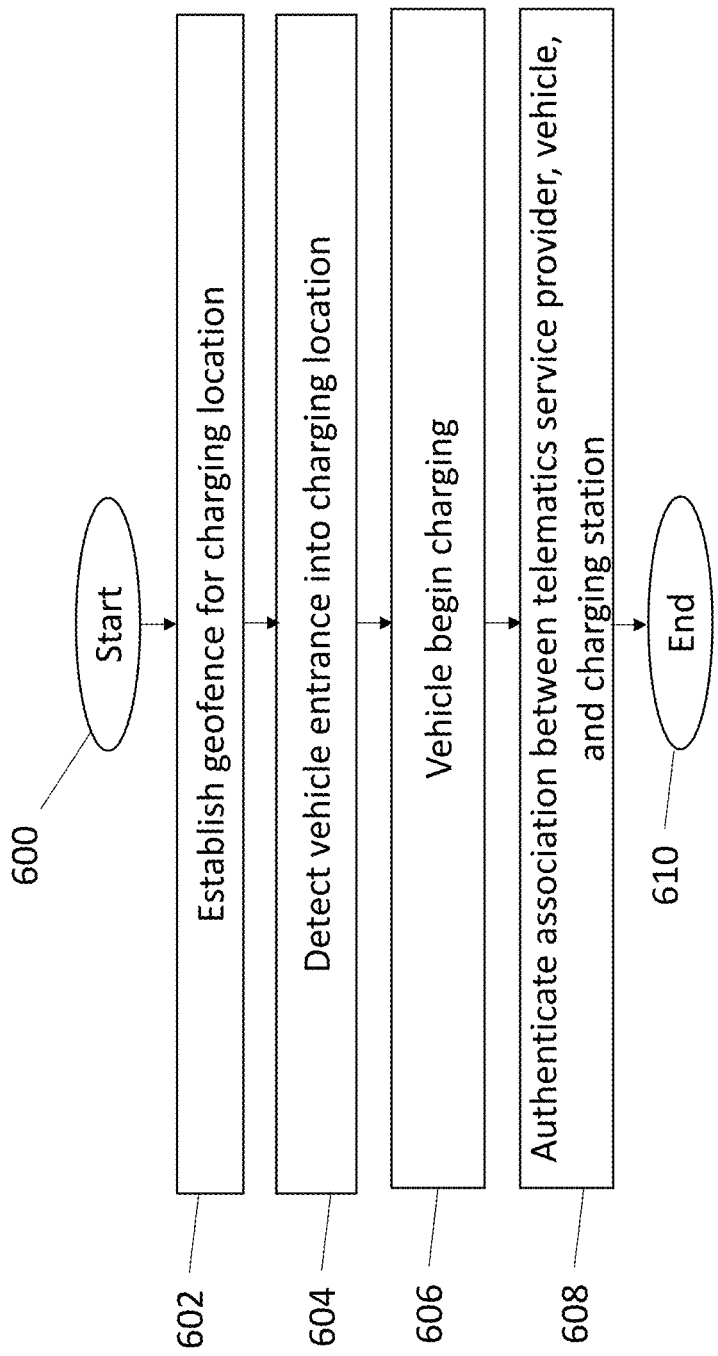
FIG. 6 is a flow chart showing illustrative processes for authenticating the driver's transaction in accordance with one aspect of the present disclosure.

FIG. 6 is a flow chart showing illustrative processes for authenticating the driver's transaction in accordance with one aspect of the present disclosure. The purpose of verifying and authenticating whether the driver of the electric vehicle has arrived at the charging station is to verify the unique identifier and make sure the transactions have actually occurred by the driver of the vehicle. The processes may begin at block 600. Fewer or more processes may be used and are not limited to those shown within the flow chart.

At block 602, a geofence around the charging station may be established. The geofence may be defined around the electric vehicle supply equipment (EVSE) such that the indicator would be activated or authorized when the vehicle is within the geofence. At this stage, the unique identifier may be set so that transactions and the money spent may be kept track of.

At block 604, a vehicle is detected entering within the geofence of the charging station. In one embodiment, instead of the geofence, the driver may be detected when they begin charging. This would initiate a message to the telematics service provider that they are indeed charging at the charging station provided by the telematics service provider. The message may be provided by the vehicle itself when it receives charge or through the EVSE.

At block 606, the vehicle begins charging. This may be accomplished when the user begins plug in of the charging cord from the EVSE into the electric vehicle. Alternatively, inductive charging may be used. Automated mechanisms may also be used for charging the vehicle.

At block 608, the telematics service provider may authenticate an association between the telematics service provider, vehicle, and charging station. The unique identifier described earlier may be used to authenticate this transaction. The authentication process results when the vehicle drives the vehicle to the directed charging station. The authentication may be used to then track transactions or the spent amount during the charging period or the period for which the user spends while at the charging station. The processes may end at block 610.

Figure 7:
FIG. 7 is a schematic diagram of an illustrative store providing amenities in accordance with one aspect of the present disclosure.

FIG. 7 is a schematic diagram of an illustrative store 702 providing amenities in accordance with one aspect of the present disclosure. The store 702 is associated with the charging station where the user has charged their vehicle and the unique identifier and the association has been authenticated. The store 702 may provide amenities and other services as previously described. Typically, the charging stations are close to the store 702. The charging station was specifically pointed to by the telematics service provider to drive in customers in return for a portion of the amount spent or revenue generated.

Transactions 704 during the period of charging or while the vehicle is at the charging station may be kept track of. Transactions associated with the electric vehicle being at the charging station/store may be determined. Each of the transactions 704 may be associated with the unique identification that was created. These transactions 704 may be kept track of on checkout or on a consistent basis. In one embodiment, the transactions 704 may be kept track of at the store, charging station, user's phone, and the like. The total amount spent may then be provided to the telematics service provider which originally pointed and directed the electric vehicle to that particular charging station. A bill for driving profits to the charging station may then be sent out by the telematics service provider.

Figure 8:
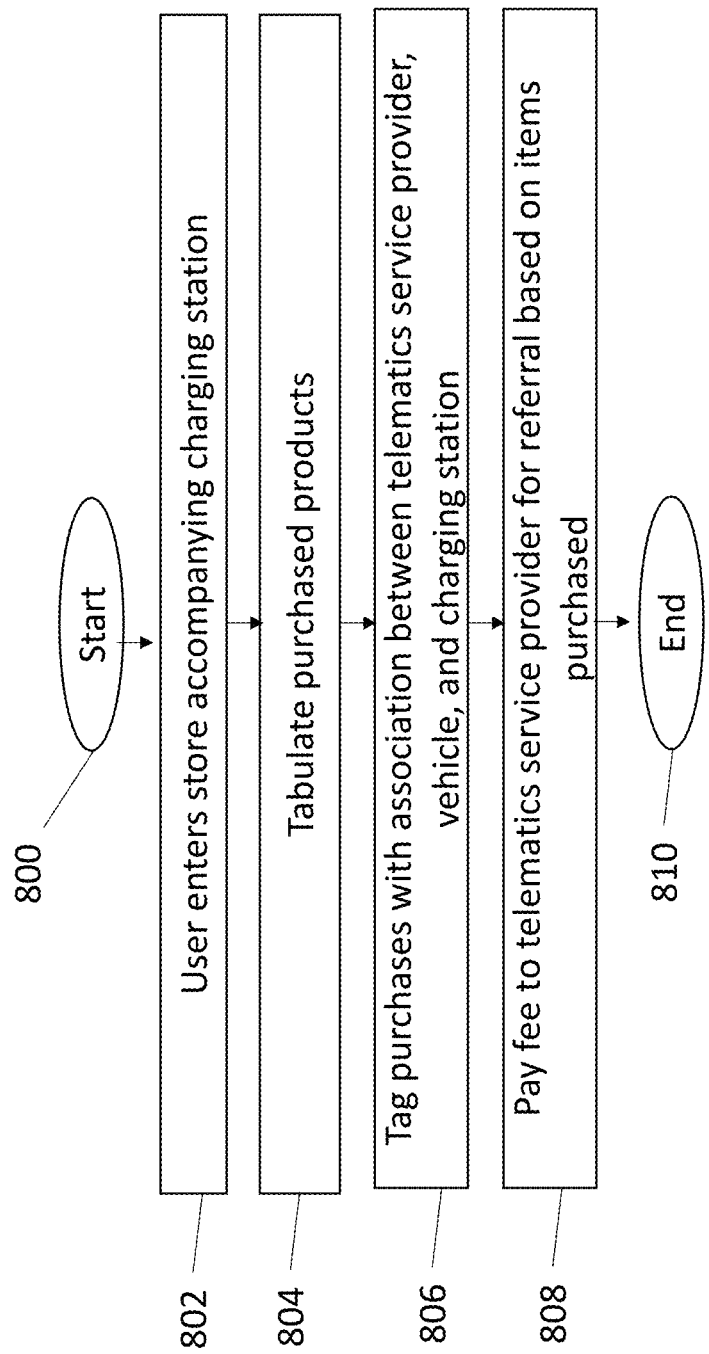
FIG. 8 is a flow chart showing illustrative processes for associating purchased products to a directed electric vehicle in accordance with one aspect of the present disclosure.

FIG. 8 is a flow chart showing illustrative processes for associating purchased products to a directed electric vehicle in accordance with one aspect of the present disclosure. Advantageously, the telematics service provider may give guidance to a charging station to increase revenues for a store that has charging stations. When the vehicle is directed towards a charging station, a unique identifier or record may be created that associates both of them together. Purchases associated with the vehicle arriving at the store would then be tethered and revenue driven by the telematics service provider would be captured. In such a way, the telematics service provider may be able to drive profits for a specific store and take a revenue share from it. The processes may begin at block 800. Fewer or more processes may be used.

At block 802, and for purposes of tracking a spent amount, the user of the charging station may enter the store accompanying the charging facility. Products or services may be purchased outside or inside of the store. The electric vehicle operator may then select items for purchase. At block 804, items that are purchased may be tabulated. The total amount spent may be calculated at checkout or on a consistent basis.

At block 806, the purchases may be tagged with the association between the telematics service provider, user and charging station. This association may be in the form of the unique identifier described above. The unique identifier may be a one time data structure that may be deleted after the transaction has been completed and the revenue sharing or portion of the total amount spent is provided to the telematics service provider. Alternatively, this information may be stored on a semi-permanent basis for providing analytics on.

At block 808, a fee may be paid to the telematics service provider for the referral based on the items purchased. Financial institute information between the telematics service provider and the charging station may have been previously stored in the database. Accessing the information may occur when the total amount is finally spent and the fee is paid. The processes may end at block 810.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A vehicle comprising:
   at least one processor; and
   a memory operatively coupled to the processor, the memory storing program instructions that when executed by the processor, causes the processor to:
      receive, from a telematics service provider, a recommendation for a charging station based at least in part on revenue-sharing parameters associated with a plurality of charging stations;
      transmit a unique session identifier associated with a charging event and a selected charging station to the telematics service provider and the charging station;
      detect a presence of the vehicle at the selected charging station using geofence data or direct vehicle-to-station communication;
      initiate tracking of user purchases at a point-of-sale system associated with the charging station or its co-located store, wherein the purchases are tagged with the unique session identifier;
      receive a report of total purchases made during the charging event; and
      enable the telematics service provider to receive a revenue portion from the charging station based on the reported purchases tagged to the unique session identifier.

2. The vehicle of claim 1, wherein the processor further provides a state-of-charge of a battery of the vehicle to the telematics service before receiving the information about the charging station, the telematics service determining the information about the charging station by using a distance drivable with the state-of-charge.

3. The vehicle of claim 2, wherein the telematics service further determines the information about the charging station by using user preferences.

4. The vehicle of claim 1, wherein the processor further authenticates whether the vehicle is charging at the charging station.

5. The vehicle of claim 4, wherein a geofence around the charging station is used for authenticating whether the vehicle is charging at the charging station.

6. The vehicle of claim 1, wherein determining the spent amount at the charging station comprises creating an association between the telematics service provider, the vehicle, and the charging station for tracking purchases at the charging station.

7. The vehicle of claim 1, wherein the portion of the spent amount is provided to the telematics service provider when the vehicle leaves the charging station.

8. The vehicle of claim 1, wherein the portion of the spent amount is based on a revenue sharing system.

9. A method for directing vehicles to a charging station to generate revenue, the method comprising:
   receiving, at a telematics service provider, a charge event from a vehicle;
   determining, based at least in part on revenue-sharing parameters received from a plurality of charging stations, a recommended charging station for the charge event;
   establishing a unique session identifier for the charge event and transmitting the unique session identifier to the vehicle and the selected charging station;
   authenticating, via geofence data or communication from the vehicle or charging station, that the vehicle has arrived at and begun charging at the selected charging station;
   receiving a report of one or more purchases made by a user of the vehicle at a point-of-sale system associated with the charging station or its store, the report being tagged with the unique session identifier; and
   billing the charging station a portion of the total amount spent by the user during the charging session, based on the report tagged to the unique session identifier.

10. The method for directing vehicles to the charging station of claim 9, wherein the charge event includes a state-of-charge of a battery of the vehicle.

11. The method for directing vehicles to the charging station of claim 9, wherein the charge event includes a type of charger compatible with the electric vehicle.

12. The method for directing vehicles to the charging station of claim 9, wherein a geofence is used to determine if the vehicle arrives at the charging station.

13. The method for directing vehicles to the charging station of claim 9, wherein a unique identifier is established between the vehicle and the charging station such that the total amount spent is tracked.

14. The method for directing vehicles to the charging station of claim 9, wherein receiving the total amount spent at the charging station occurs after the vehicle completes charging.

15. The method for directing vehicles to the charging station of claim 9, wherein billing the charging station the portion of the total amount spent is based on amenities provided at the charging station.

16. A server comprising:
   at least one network connection; and
   a control system for communicating with a plurality of vehicles over the at least one network connection to provide information about charging stations, the control system:
      configured to receive, from a vehicle, a charge event and determine a recommended charging station based at least in part on revenue-sharing parameters associated with a plurality of charging stations;
      configured to generate and assign a unique session identifier for the charge event;
      configured to authenticate that the vehicle has arrived at the selected charging station using geofence data or charging initiation signals;
      configured to receive, from a point-of-sale system associated with the charging station or its store, a report of purchases tagged with the unique session identifier; and
      configured to bill the charging station a portion of the total purchase amount made during the charging session based on the tagged report.

17. The server of claim 16, wherein the control system establishes a unique identifier associating the vehicle with the charging station such that the total amount spent is tracked.

18. The server of claim 16, wherein the control system establishes a relationship between the charging station such that the charging station will provide the portion of the total amount spent.

19. The server of claim 16, wherein the vehicle provides the information about the charge event through an in-vehicle telematics unit.

20. The server of claim 16, wherein the at least one network connection establishes a connection between the charging station and the vehicle.

\* \* \* \* \*